Patented Apr. 21, 1953

2,635,964

UNITED STATES PATENT OFFICE 2,635,964

CHEWING GUM BASE MATERIAL

Eric J. Hewitt, Dobbs Ferry, and Murray Berdick, New York, N. Y., assignors to American Chicle Company, Long Island City, N. Y., a corporation of New Jersey No Drawing. Application January 23, 1951, Serial No. 207,438

2 Claims. (Cl. 99—135)

This application is a continuation in part of our application for patent, filed February 12, 1948, Serial No. 8,006. In the process of said application, mono-olefin adducts are produced by reacting a mono-olefin (straight or branched-chain, non-cyclic, non-aromatic, notably a long chain mono-olefin) with an alpha, beta-enal compound, in the presence of a high-boiling material capable of undergoing a Diels-Alder reaction with the alpha, beta-enal. An example is dodecene (commercial mixture) as the mono-olefin, maleic anhydride as the alpha, beta-enal, and tall oil as the high-boiling material.

We have discovered that resins ideally suitable for use as chewing gum base constituents can be obtained by reaction of said adducts with one, or a mixture of two or more, of the group of polyhydric alcohol and amine alcohols and polybasic amine. The resins thus obtained are non-crystalline, and possess in satisfactory degree the required eutectics, melting point characteristics, elasticity, stability, set-up, friability, fluidity and chewing characteristics, which in chicle are associated with the function of amyrin caproate—a soft crystalline resin—in combination with amyrin acetate. Furthermore, the resinous products are free from undesirable taste, toxicity and such other physical characteristics as would make them unsuitable for use in chewing gum bases. Depending on the choice of reagent, the resinous product will be a polyester, a polyamide, or a polyester-polyamide.

For the purpose of exemplification, but not limiting the disclosure set forth herein, the following examples are described:

Example 1

A conjoint mono-olefin adduct was prepared by reacting 224 grams of commercial dodecene (the mono-olefin) with 196 grams of maleic anhydride (the alpha, beta-enal compound) in the presence of 196 grams of tall oil (the high boiling material capable of undergoing a Diels-Alder reaction with the alpha, beta-enal) for a period of 12 hours of refluxing to yield a product having an acid value of 360.

150 grams of the above conjoint mono-olefin adduct was mixed with 26.6 grams of propylene glycol, and the mixture was heated under reflux, with agitation, for four hours. During this time, the reaction temperature dropped from 158° C. to 138° C. At the end of that period, water was distilled off, and the reaction temperature raised to 200° C., for one hour. Nitrogen was passed into the reaction, with agitation, for one hour while the temperature was maintained between 200–230° C.

The product was mixed with 8.8 grams of stearic acid. While mixing at 200°–230° C. for two hours, the reaction was swept with nitrogen. The product was a slightly soft, non-sticky, tasteless polyester resin.

Example 2

150 grams of the conjoint mono-olefin adduct described in Example 1 was mixed with 150 grams of distilled water. The mixture was brought to reflux, with stirring. While refluxing, 22.2 grams ethylene diamine (69.5%) were added slowly. Then refluxing was continued for one hour. Water was distilled off under reduced pressure, the temperature of the reaction rising to 220° C.

19.5 grams propylene glycol were added. The reaction was heated with stirring for two hours under reflux, during which time the temperature dropped from 170° C. to 150° C. Water was then distilled off. While stirring, the reaction was swept with nitrogen at 200–230° C. for two hours.

15 grams stearic acid were added. The reaction was swept with nitrogen for one hour, with stirring, at 200–230° C. The product was a slightly soft polyester-polyamide resin.

The following examples illustrate variations in properties which may be achieved by increasing the reactive functionality of the polyhydric alcohols employed:

The plasticity of the resin can be somewhat controlled by the proportional amounts of polyhydric alcohols, polybasic amines, amine alcohols, or mixtures thereof, employed in transforming the adduct into a resin; if polyhydric alcohols are used in preponderance, a soft resin is obtained, and if polyamines are used in preponderance, a hard or brittle resin is obtained.

Example 3

200 grams of the conjoint mono-olefin adduct of Example 1 were mixed with 28.2 grams of proylene glycol and 6.8 grams of glycerol.

The mixture was refluxed, with stirring, for 14.5 hours. During that time, the reaction temperature dropped from 153° C. to 120° C. Water was distilled off, the temperature raised to 200° C., and maintained at 200° C. for four hours. The reaction was swept with nitrogen for one hour, with stirring, at 200–220° C.

A rubber-like resinous product resulted.

Example 4

100 grams of the conjoint mono-olefin adduct of Example 1 was mixed with 11.7 grams of propylene glycol and 4.7 grams of glycerol.

The mixture was stirred and heated under reflux. The reaction temperature dropped from 169° C. to 140° C. At that time, water was distilled off until the temperature rose to 195° C. More distillate was collected under reduced pressure at 185–195° C., while stirring.

The product was a brittle resin.

*Example 5*

140 grams of the conjoint mono-olefin adduct of Example 1 was mixed with 17.8 grams of propylene glycol and 5.4 grams of glycerol. The mixture was stirred under reflux for 8 hours, during which time the temperature dropped from 175° C. to 143° C. The reaction was refluxed for another 8 hours, during which time the temperature remained constant. Water was distilled off, and the temperature raised to 200° C. for four hours. The reaction was stirred, and swept with nitrogen for one hour.

The product was a tough resin.

Thus, the adduct without purification or isolation, when reacted with one or a mixture from the group of polyhydric and amine alcohols and polybasic amines, produces resins whose physical characteristics can be varied by control of the reactant, to meet specific requirements as chewing gum base constituents. That the resins possess especially good physical properties for the desired purpose is due to the fact that they embody a variety of molecular configurations, particularly long chain, lending internal plasticization.

It will be understood that in the preparation of the adduct the high-boiling material may be a fatty acid obtained from any suitable material such as soya, linseed, animal fats, etc., or a mixture of such fatty acids, or a mixture of one or more fatty acids with one or more rosin acids.

The most general composition of such a chewing gum base consists of a high-melting crystalline resin combined with the resin of the conjoint mono-olefin adducts, above described, and in combination with an elastomer, a blending agent, and a regulator of solubilities. It is being pointed out here that all these compounds are primary ingredients and may be used by themselves or with the addition of certain secondary ingredients, which are useful but not essential, as basic materials for chewing gum bases.

By emulating the crystalline structure of the natural chicle, which is accomplished by combining the above described resins with a crystalline resin and with other suitable components, a synthetic product is obtained which displays substantially the eutectic and structure characteristics of natural chicle. The compound thus obtained displays the specific polymorphic states which are particularly common to and characteristic of natural chicle.

The resin of the conjoint mono-olefin adduct modified as above described which is the synthetic non-crystalline resin, specifically set forth in the examples must, when combined with a natural or synthetic crystalline resin, display a mutual solubility. This mutual solubility is characterized by the fact that both resins will form eutectics.

The resin materials in combination, form within the gum base, when combined with an elastomer, a crystalline lattice somewhat akin to a honeycomb framework. As the particularly characteristic polymorphic states of natural chicle are based upon such a type of crystalline structure, when synthetically emulating this crystalline structure a synthetic chewing gum base substantially possessing the same polymorphic characteristics which are displayed by the natural chicle, is thus synthesized.

We claim:

1. A synthetic non-crystalline chewing gum base resin constituent consisting of the reaction product of commercial dodecene, maleic anhydride and tall oil having a carbon to carbon conjugated double bond, with a mixture of polyhydric alcohols.

2. The synthetic non-crystalline chewing gum base resin constituent of claim 1 wherein the mixture of alcohols consist of propylene glycol and glycerol.

ERIC J. HEWITT.
MURRAY BERDICK.

No references cited.